US010769566B2

(12) United States Patent
Duan et al.

(10) Patent No.: US 10,769,566 B2
(45) Date of Patent: Sep. 8, 2020

(54) MANAGING PROCESS INSTANCES

(71) Applicant: International Business Machines Corporation, Armonk, NY (US)

(72) Inventors: Zi Hui Duan, Beijing (CN); Yu Gong Li, Beijing (CN); Xin Peng Liu, Beijing (CN); Yue Wang, Beijing (CN); Jing Jing Wei, Beijing (CN); Dian Guo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 15/286,412

(22) Filed: Oct. 5, 2016

(65) Prior Publication Data
US 2018/0096269 A1 Apr. 5, 2018

(51) Int. Cl.
*G06Q 10/06* (2012.01)
*G06Q 40/08* (2012.01)

(52) U.S. Cl.
CPC .............................. *G06Q 10/0633* (2013.01)

(58) Field of Classification Search
CPC .............................. G06Q 10/06; G06Q 40/08
USPC ....................................................... 705/7.27
See application file for complete search history.

(56) References Cited

U.S. PATENT DOCUMENTS

| 8,572,618 | B2 | 10/2013 | Kand et al. |
| 8,600,792 | B2 | 12/2013 | Drittler et al. |
| 9,003,430 | B2 | 4/2015 | Diament et al. |
| 9,213,950 | B2 | 12/2015 | Randell |
| 2003/0191679 | A1* | 10/2003 | Casati ................ G06Q 10/0631 705/7.12 |
| 2003/0233374 | A1 | 12/2003 | Spinola et al. |
| 2007/0094199 | A1* | 4/2007 | Deshpande ............ G06N 5/025 706/47 |
| 2009/0024514 | A1 | 1/2009 | Kumaran et al. |
| 2009/0172149 | A1* | 7/2009 | Bobak .................... G06Q 10/06 709/224 |
| 2011/0153369 | A1* | 6/2011 | Feldman ................ G06Q 40/08 705/4 |
| 2013/0031566 | A1* | 1/2013 | Sureshan ........... G06Q 10/0633 719/313 |

(Continued)

FOREIGN PATENT DOCUMENTS

EP          1760588 A1     3/2007

OTHER PUBLICATIONS

Westerman, J.: "The Case for Business Process Management", BP Trends, Apr. 2009, pp. 1- 5.

*Primary Examiner* — Nga B Nguyen
(74) *Attorney, Agent, or Firm* — Patterson + Sheridan, LLP

(57) ABSTRACT

A process instances guard system for managing the execution of process instances based on statuses of other process instances in a business process management (BPM) engine is disclosed. The process instances guard system provides a plurality of policies for managing the execution of process instances. When a status change event related to an existing process instance is received, the process instances guard system matches the existing process instance with a policy. After determining that the existing process instance matches the prerequisite condition of a policy, the process instances guard system determines that a plurality of existing process instances match the policy target descriptor of the policy, and executes the action of the policy on the plurality of existing process instances.

20 Claims, 5 Drawing Sheets

(56) References Cited

U.S. PATENT DOCUMENTS

| | | | |
|---|---|---|---|
| 2013/0060596 A1* | 3/2013 | Gu | G06Q 10/06 |
| | | | 705/7.27 |
| 2013/0159060 A1 | 6/2013 | Steinbach | |
| 2013/0238384 A1* | 9/2013 | Caesar | G06F 8/34 |
| | | | 705/7.27 |
| 2015/0019284 A1* | 1/2015 | Kwan | G06Q 10/06316 |
| | | | 705/7.26 |
| 2015/0026760 A1* | 1/2015 | Lipman | G06F 21/6245 |
| | | | 726/1 |
| 2015/0156065 A1* | 6/2015 | Grandhe | H04L 41/5054 |
| | | | 709/224 |
| 2017/0116550 A1* | 4/2017 | Nutheti | G06Q 10/0637 |

\* cited by examiner

INSTANCES GUARDING TABLE — 401

| INSTANCE ID | POLICY ID | ORIGINAL STATUS | ACTION TAKEN? |
|---|---|---|---|
| 1001 | P1 | SUSPENDED | N |
| 1002 | P2 | ACTIVE | Y |
| .... | | | |
| 1007 | P2 | ACTIVE | Y |
| .... | | | |

POLICY EXECUTION TABLE — 402

| POLICY ID | EXECUTION STATUS |
|---|---|
| P1 | INACTIVE |
| P2 | ACTIVE |
| .... | |

FIG. 4

MANAGING PROCESS INSTANCES

BACKGROUND

The present disclosure relates to managing process instances, and more specifically, to managing the execution of process instances based on statuses of other process instances in a business process management (BPM) engine.

Generally, BPM systems facilitate the management of business activity flows and provide organizations with the ability to save money and time. Such BPM systems may provide the ability to model, manage, automate, measure and optimize business processes for an organization. Additionally, BPM systems can provide continuous comprehension and management of business processes that interact with people and systems, both within and across organizations.

For a given BPM engine, there may be millions of process instances running independently, with each process instance being executed according to a pre-designed workflow or sequence defined by a corresponding process definition. Generally, each process instance executes independently and without considering statuses of other process instances. However, in some circumstances, there may be some real-time or ad-hoc requirements that require some process instances to be executed based on statuses of other process instances.

SUMMARY

One embodiment of the present invention provides a method that includes providing a plurality of policies for managing existing process instances of a business process management (BPM) engine. Each of the plurality of policies includes a policy target descriptor specifying a set of process instances, an action to be executed, and a prerequisite condition to perform the action. The method further includes receiving a first status change event related to a first existing process instance. The first existing process instance is defined by a first process definition, where the first process definition specifies a first workflow to implement a first plurality of related tasks of a first process. Additionally, the method includes matching the first existing process instance with a first policy by comparing attributes of the first existing process instance to the prerequisite condition of the first policy. In response to determining that the attributes of the first existing process instance satisfy the prerequisite condition of the first policy, the method includes determining that a plurality of existing process instances match the respective policy target descriptor of the first policy, where the plurality of existing process instances are defined by a second process definition that specifies a second workflow to implement a second plurality of related tasks of a second process, and executing the respective action of the first policy on the plurality of existing process instances.

One embodiment of the present invention provides a system that includes a processor and a memory. The memory contains a program that, when executed on the processor, performs an operation. The operation includes providing a plurality of policies for managing existing process instances of a business process management (BPM) engine. Each of the plurality of policies includes: a policy target descriptor specifying a set of process instances, an action to be executed, and a prerequisite condition to perform the action. The operation further includes receiving a first status change event related to a first existing process instance. The first existing process instance is defined by a first process definition, where the first process definition specifies a first workflow to implement a first plurality of related tasks of a first process. Additionally, the operation includes matching the first existing process instance with a first policy by comparing attributes of the first existing process instance to the prerequisite condition of the first policy. In response to determining that the attributes of the first existing process instance satisfy the prerequisite condition of the first policy, the operation includes determining that a plurality of existing process instances match the respective policy target descriptor of the first policy, where the plurality of existing process instances are defined by a second process definition that specifies a second workflow to implement a second plurality of related tasks of a second process, and executing the respective action of the first policy on the plurality of existing process instances.

One embodiment of the present invention provides a computer program product that includes a computer-readable storage medium having computer readable program code embodied therewith. The computer readable program code provides a plurality of policies for managing existing process instances of a business process management (BPM) engine. Each of the plurality of policies includes: a policy target descriptor specifying a set of process instances, an action to be executed, and a prerequisite condition to perform the action. The computer readable program code further receives a first status change event related to a first existing process instance. The first existing process instance is defined by a first process definition, where the first process definition specifies a first workflow to implement a first plurality of related tasks of a first process. Additionally, the computer readable program code matches the first existing process instance with a first policy by comparing attributes of the first existing process instance to the prerequisite condition of the first policy. In response to determining that the attributes of the first existing process instance satisfy the prerequisite condition of the first policy, the computer readable program code determines that a plurality of existing process instances match the respective policy target descriptor of the first policy, where the plurality of existing process instances are defined by a second process definition that specifies a second workflow to implement a second plurality of related tasks of a second process, and executes the respective action of the first policy on the plurality of existing process instances.

BRIEF DESCRIPTION OF THE SEVERAL VIEWS OF THE DRAWINGS

FIG. 4 shows an instances guarding table and a policy execution table stored in a instances guarding database, according to one embodiment described herein.

DETAILED DESCRIPTION

Figure 1:
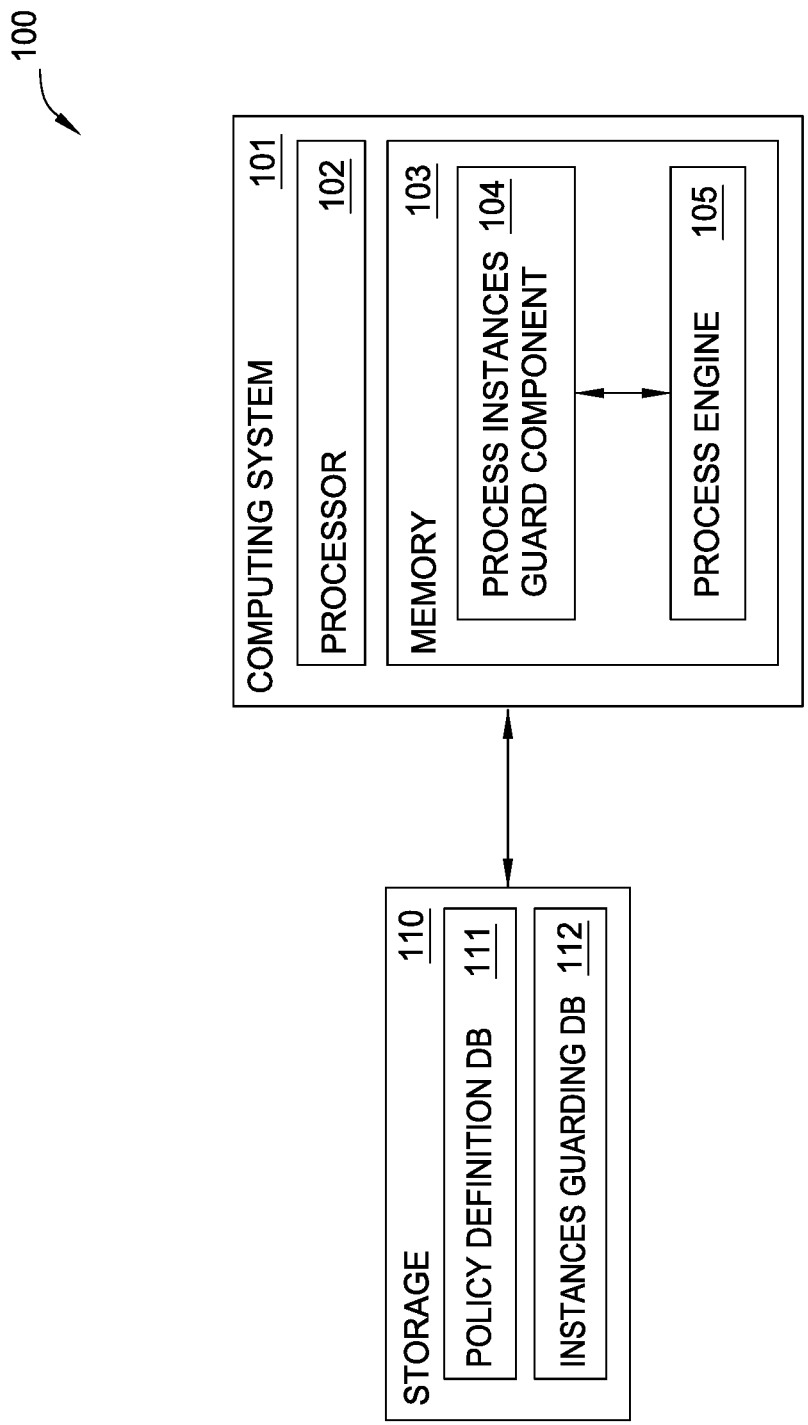
FIG. 1 is a block diagram illustrating a process instances guard system, according to one embodiment described herein.

Generally, a BPM engine can define a set of business processes through the use of process definitions. As used herein, a business process refers to a collection of linked tasks that, once completed, will accomplish an organizational goal. Such a process definition can specify the workflow or the sequence of events needed to implement the tasks of a corresponding business process. A process instance, as used herein, refers to a specific occurrence or execution of a process defined by a process definition. In other words, a process instance is a running process according to its corresponding process definition.

Typically, a given BPM engine may have a large amount (e.g., millions) of process instances running independently at a given point in time. That is, the process instances running in the BPM engine are executed in their pre-designed workflow or sequence according to the corresponding process definitions, without considering statuses of other process instances.

However, there may be some real-time or ad-hoc requirements that require some process instances to be executed based on statuses of other process instances. For example, during a very busy period, there may be a real-time requirement that all order processing process instances with order approval tasks whose amounts are less than $10 k should be suspended until all order processing process instances with order approval tasks whose amounts are greater than $10K have already been processed. Another example is an ad-hoc requirement that all employee hiring process instances for a specific department should be suspended until a project plan approval process instance for this department is executed with approval. Because such requirements are generally real-time or ad-hoc, the execution of process instances to satisfy such requirements cannot be modeled or predefined at design time, e.g., real-time at the process definition stage. Instead, the execution of process instances to satisfy such requirements can only be guarded or managed at runtime. Also, such requirements can be raised for existing process instances or for upcoming process instances that have not yet been generated.

Currently, users can only manage the execution of process instances to satisfy the real-time or ad-hoc requirements manually, which is a complex and error-prone process. Also, with manual management by users, it is hard to manage the execution of the process instances to satisfy the real-time or ad-hoc requirements in a reasonable time for large systems. Moreover, with manual management by users, it is hard to manage upcoming process instances that have not yet been generated.

As such, embodiments described herein provide a process instances guard system for managing process instances. In one embodiment, the process instances guard system provides a policy definition tool to support users to model or define their requirements as policies. The process instances guard system may also provide an instances guard engine to manage existing and upcoming process instances according to the policies. The process instances guard system can instruct a process engine, e.g., a BPM engine, to execute specified actions automatically for qualified process instances once specified conditions are met.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. For example, the process instances guard system could execute on a computing system in the cloud. In such a case, the process instances guard system could manage executions of process instances and store runtime data of the management at a storage location in the cloud. Doing so allows a user to access this information from any computing system attached to a network connected to the cloud (e.g., the Internet).

With reference now to FIG. 1. FIG. 1 is a block diagram illustrating a process instances guard system 100, according to one embodiment of the present invention. The process instances guard system 100 includes a computing system 101. The computing system 101 includes a processor 102 and a memory 103. The processor 102 may be any computer processor capable of performing the functions described herein. According to one embodiment, the memory 103 includes a process instances guard component 104 and a process engine 105. The process instances guard component 104 manages existing and upcoming process instances based on statuses of other process instances. The process engine 105 executes the process instances based on the instructions from the instances guard component 104. In one embodiment, the process engine 105 is a BPM engine. Although memory 103 is shown as a single entity, memory 103 may include one or more memory devices having blocks of memory associated with physical addresses, such as random access memory (RAM), read only memory (ROM), flash memory or other types of volatile and/or non-volatile memory.

The process instances guard system 100 also includes storage 110. In one embodiment, the storage 110 includes a policy definition database 111 and an instances guarding database 112. The policy definition database 111 and the instances guarding database 112 store data used for managing existing and upcoming process instances based on statuses of other process instances. The computing system 101 communicates with the storage 110 to manage existing and upcoming process instances based on statuses of other process instances, which will be described in details below. In one embodiment, the storage 110 may be included in the computing system 101. In another embodiment, the computing system 101 may access the storage 110 through a communication network, e.g., a local area network (LAN) or a wide area network (WAN), or the Internet (not shown in FIG. 1). In another embodiment, the storage 110 may be located in a cloud computing platform.

Figure 2:
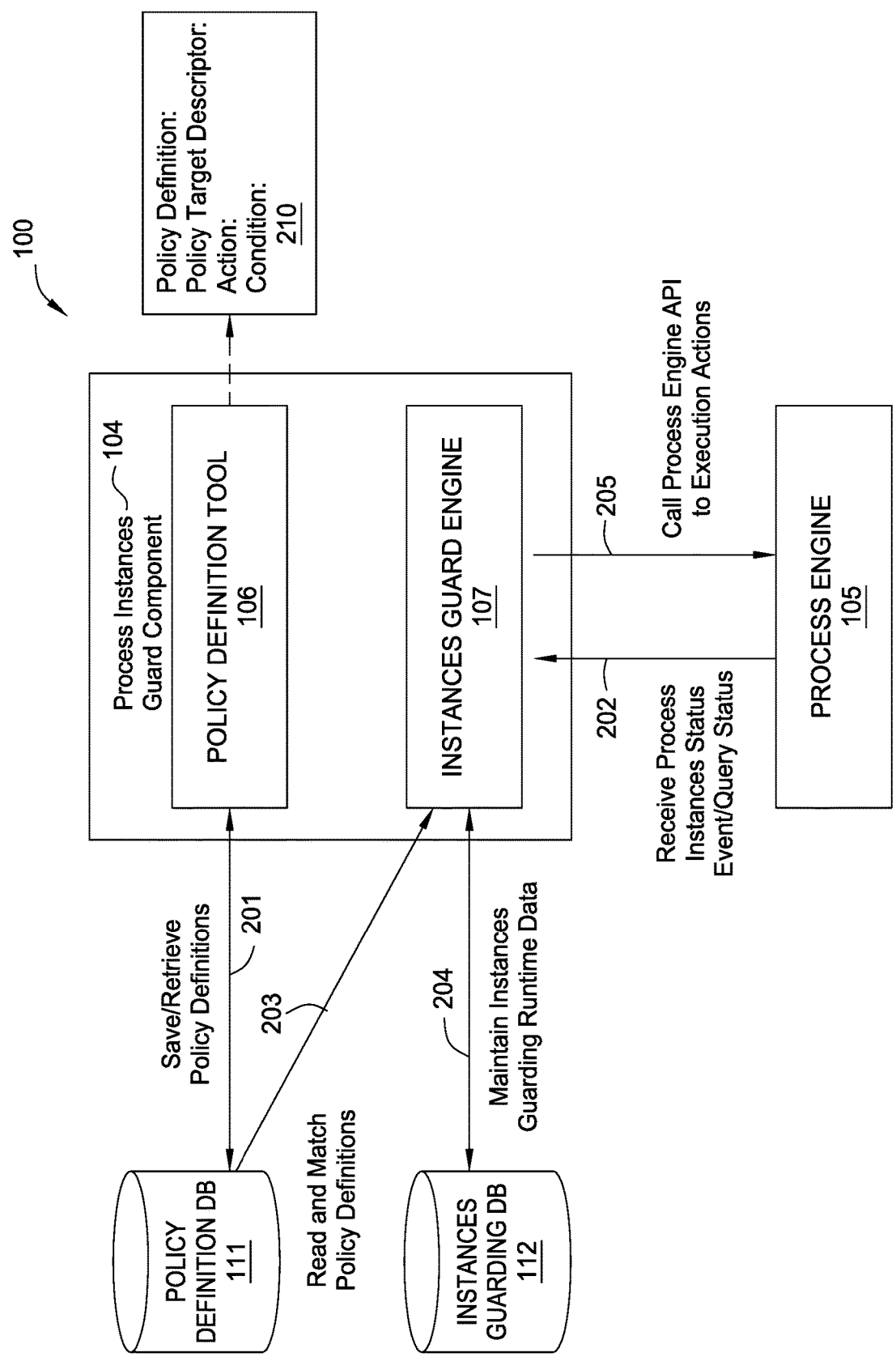
FIG. 2 illustrates interactions among different components of the process instances guard system, according to one embodiment described herein.

FIG. 2 illustrates interactions among different components of the process instances guard system 100, according to one embodiment of the present invention. As shown in FIG. 2, the process instances guard component 104 includes a policy definition tool 106 and an instances guard engine 107.

Generally, a real-time or ad-hoc requirement to execute process instances can be implemented using a policy. A policy is described by its corresponding policy definition. The policy definition tool 106 can be used to support users to define their policies. The users' requirements can be defined as policies used for implementing existing process instances or upcoming process instances that have not been generated yet. In one embodiment, the policy definition tool 106 can provide a user interface for the users to create, modify or delete their policies.

In one embodiment as shown in FIG. 2, a policy definition 210 includes a policy target descriptor, an action and a condition. The policy target descriptor generally specifies a set of process instances. The action specifies an action that should be executed on the set of process instances as indicated by the policy target descriptor. The third component is condition. Condition specifies the prerequisite condition that must be satisfied to perform the action. In one embodiment, a policy is defined by the users by using the policy definition tool 106. The users can define multiple policies to represent the users' different requirements for execution of process instances.

The policy definition 210 as shown in FIG. 2 is only one example. In other embodiments, the policy definition can be different. In other embodiments, the policy target descriptor of a policy can specify multiple sets of process instances, each with a respective or different process definition. Also, the action of the policy can specify multiple or different actions. Moreover, the condition of the policy can specify multiple or different prerequisite conditions.

After the users define the policies by using the policy definition tool 106, the users can save the defined policies in the policy definition database 111 for future use, as indicated by arrow 201 in FIG. 2. Also, the users can retrieve previously saved policies from the policy definition database 111.

Generally, the instances guard engine 107 manages the execution of process instances to satisfy the policies or requirements defined by the users. In one embodiment, the instances guard engine 107 receives a status change event related to a process instance from a process engine 105, e.g., a BPM engine, as indicated by arrow 202. In another embodiment, the instances guard engine 107 may query the process engine 105 to obtain information of a status change event related to a process instance. The status change event related to a process instance may include but not limited to: creating the process instance by the process engine 105; ending the process instance by the process engine 105; and implementing the process instance from one task to the next task of the process by the process engine 105.

After receiving or obtaining the status change event related to a process instance, the instances guard engine 107 can read policy definitions from the policy definition database 111 and match the process instance having the status change event to a policy stored in the policy definition database 111, as indicated by arrow 203.

The instances guard engine 107 can save instances guard runtime data to the instances guarding database 112. Also, the instances guard engine 107 can retrieve the saved runtime data from the instances guarding database 112. The instances guard runtime data can include data related to execution statuses of the policies and execution statuses of the process instances. In this way, the instances guarding database 112 can maintain the runtime data for managing the execution of process instances based on the policies, as indicated by arrow 204. Maintaining the instances guard runtime data by the instances guarding database 112 will be described in more details below.

When the process instance having the status change event matches a policy, the instances guard engine 107 can request the process engine 105, e.g., the BPM engine, to execute the action of the policy on the process instance. In one embodiment, the instances guard engine 107 may call the Application program interface (API) of the BPM engine to execute the actions, as indicated by arrow 205.

Figure 3:
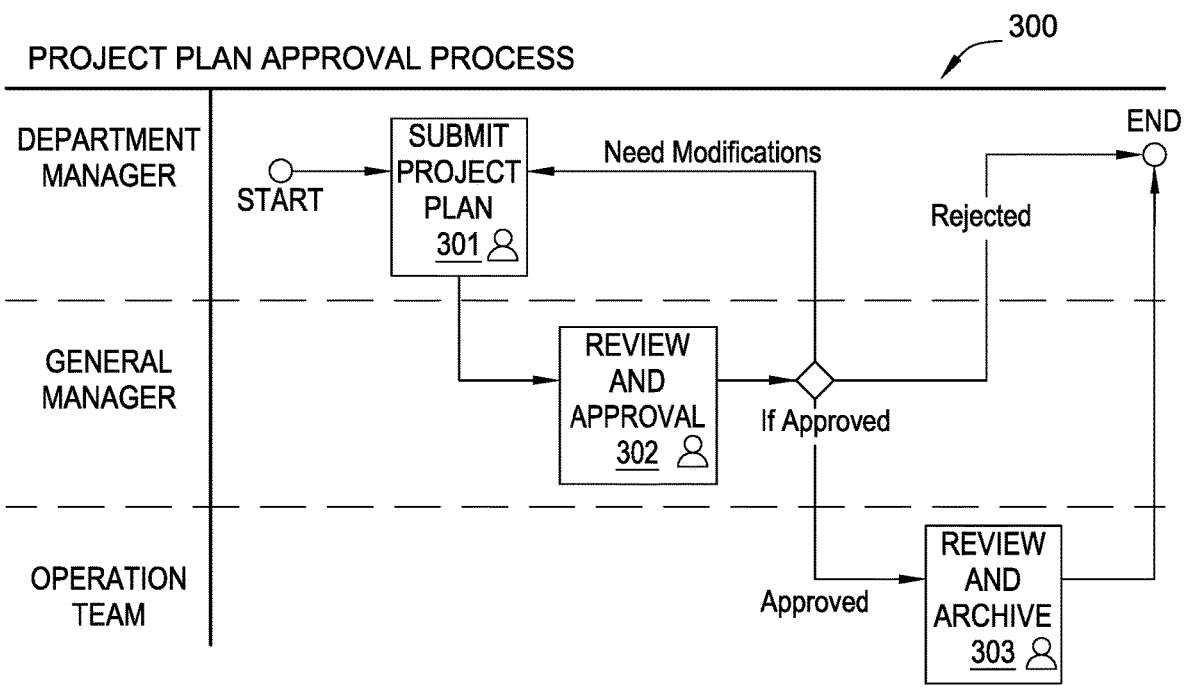
FIG. 3 illustrates an example of two processes with different process definitions, according to one embodiment described herein.
Figure 3:
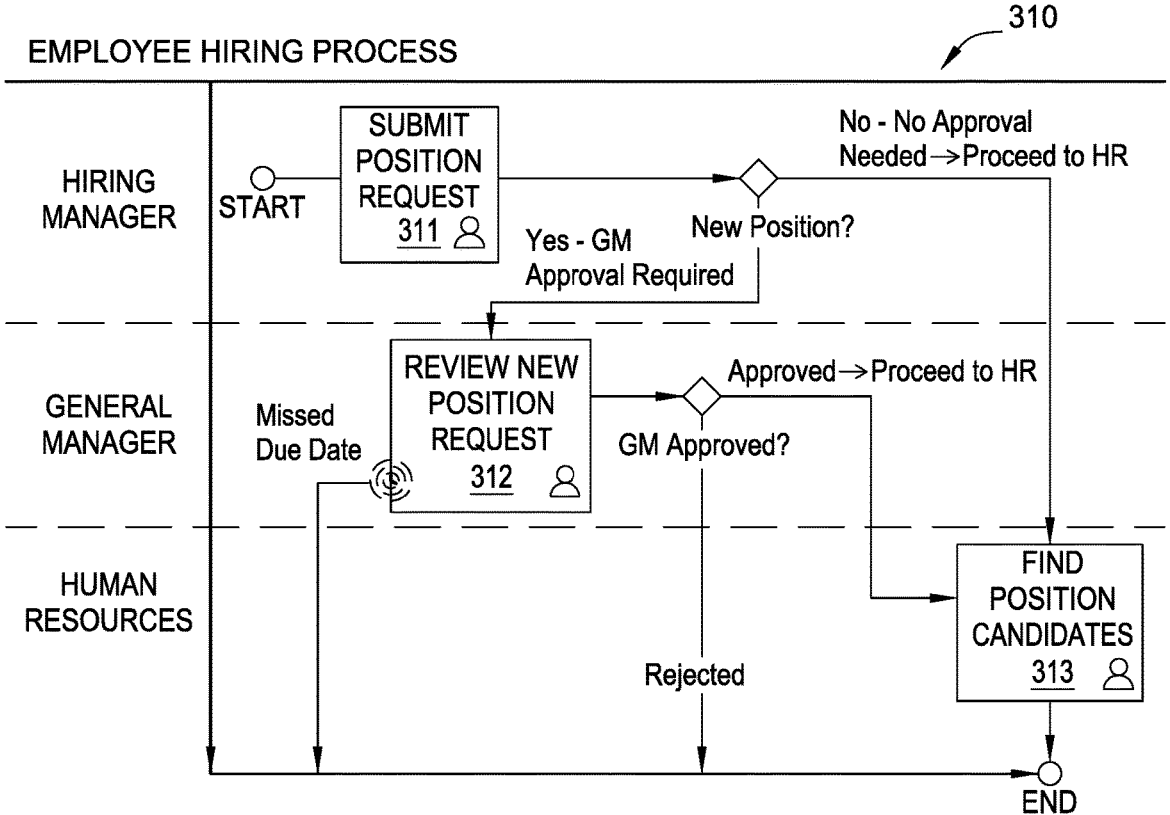

FIG. 3 illustrates an example of two processes with different process definitions, according to one embodiment of the present invention. Specifically, FIG. 3 illustrates two business processes, i.e., a project plan approval process 300 and an employee hiring process 310.

The process definition of the project plan approval process 300 is described in the top part of FIG. 3. The project plan approval process definition defines a workflow to implement a plurality of related tasks of the project plan approval process. Specifically, as shown in FIG. 3, after the project plan approval process starts, the first task of the process, as shown at step 301, is that the department manager of a department, e.g., department A, submits a project plan to the general manager. Then the project plan approval process proceeds to the second task at step 302. The second task at step 302 is that the general manager reviews and approves the project plan. As shown in FIG. 3, when implementing the second task at step 302, the general manager may reject the project plan, or require modification and resubmission of the project plan, or directly approve the project plan. If the general manager rejects the project plan, the process is ended directly. If the general manager approves the project plan after the department manager modifies and resubmits the project plan, or if the general manager approves the project plan directly, the project plan approval process proceeds to the third task at step 303. The third task at step 303 is that the operation team review and archive the project plan. After the third task at step 303 is implemented, the process is ended.

The process definition of the employ hiring process 310 is described in the bottom part of FIG. 3. The employ hiring process definition defines a workflow to implement a plurality of related tasks of the employ hiring process. Specifically, as shown in FIG. 3, after the employ hiring process starts, the first task of the process, as shown at step 311, is that the hiring manager of a department, e.g., department A, submits a position request to the general manager. As shown in FIG. 3, if the position requested is a new position for the department, then the employ hiring process proceeds to the second task at step 312. The second task at step 312 is that the general manager reviews the new position request in a certain time duration, e.g., before a certain due date. As shown in FIG. 3, when implementing the second task at step 312, the general manager may miss the due date to review the new position request, or reject the new position request, or approve the new position request. If the general manager misses the due date to review the new position request or rejects the new position request, the process is ended directly. If the general manager approves the new position request, the employ hiring process proceeds to the third task at step 313. The third task at step 313 is that the human resources find position candidates. After the new position is filled, the process is ended. On the other hand, if the position requested is not a new position, e.g., a position due to the resignation of an employee, there is no need for the general manager to approve such a request. In this situation, the employ hiring process proceeds directly from the first task at step 311 to the third task at step 313, as shown in FIG. 3.

Conventionally, the project plan approval process is executed as one or more project plan approval process instances according to the project plan approval process definition independently without considering status of other process instances. Similarly, the employ hiring process is executed as one or more employ hiring process instances according to the employ hiring process definition independently without considering status of other process instances.

However, according to one embodiment of the present invention, there may be a requirement that requires the execution of one or more employ hiring process instances should be based on statuses of one or more project plan approval process instances. For example, such a requirement can be that all employee hiring process instances requesting a new position for department A should be suspended at step 312, i.e., the general manager's "Review new position request" task, if a specific project plan for department A is not approved by the general manager at step 302 of a corresponding project plan approval process instance. Only when the specific project plan for department A is approved by the general manager at step 302 of the corresponding project plan approval process instance, the employee hiring process instances for department A can be reviewed and approved at step 312. When such a requirement arises, the BPM engine cannot implement process instances of the two processes in FIG. 3 independently without considering each other. Instead, the process instances guard system 100 will be used to manage the execution of process instances of the two processes to satisfy the requirement.

The above requirement can be defined by the users as a policy according to one embodiment of the present invention. Specifically, the above requirement can be defined as an exemplary policy definition 320 as shown in Table 1. In Table 1, "&" is equal to "and" as well known in the art. In the exemplary policy definition 320, the policy target descriptor specifies a set of employee hiring process instances, as indicated by "Process: Employee hiring process" in the policy target descriptor. The policy target descriptor also specifies one or more attributes of the specified set of process instances. Specifically, in the exemplary policy definition 320, "department Id: A" is one attribute of the set of employee hiring process instances. Thus, the policy target descriptor specifies that the set of employee hiring process instances is for department A. Another attribute of the specified set of process instances is the status of the specified set of process instances. In one embodiment, the status of the specified set of process instances indicates which task of the corresponding process is being implemented. Specifically, in the exemplary policy definition 320, "process.task.managerApproval=active" is an attribute indicating the status of the set of employee hiring process instances. In this example, the status of the specified set of hiring process instances is that the general manager is actively implementing the task of review for approval at step 312. Thus, policy target descriptor of the exemplary policy definition 320 specifies a set of employee hiring process instances for department A where the general manager is actively implementing the task of review for approval at step 312.

TABLE 1

| Policy Definition 320 |
| --- |
| Policy Target Descriptor: Process: Employee hiring process<br>& department ID: A<br>& process.task.managerApproval = active<br>Action: Suspend |
| Condition: Process: Project plan approval process<br>& department Id: A<br>& process.data.managementApproval = false |

In the exemplary policy definition 320, the action of the policy specifies one action: "suspend". The condition of the policy specifies the prerequisite condition that must be satisfied to perform the suspend action on the set of employee hiring process instances as indicated in the policy target descriptor. Specifically, in the exemplary policy definition 320, the condition of the policy specifies a project plan approval process instance, as indicated by "Process: Project plan approval process" in the condition. Moreover, the condition requires that the project plan approval process instance must have two attributes. The first attribute is that the project plan approval process instance is for department A, as indicated by "department Id: A" in the condition. The second attribute specifies the statue of the project plan approval process instance. Specifically, in the exemplary policy definition 320, the status of the project plan approval process instance is that the general manager rejects the project plan at step 302, as indicated by "process.data.managerApproval=false" in the condition. Thus, the condition can be summarized as: a project plan approval process instance for department A is not approved by the general manager at step 302.

Based on the above definitions, the exemplary policy definition 320 can be explained in this way: if a project plan approval process instance for department A is not approved by the general manager at step 302, then all employee hiring process instances that the general manager is actively implementing the task of review for approval at step 312 should be suspended. This policy satisfies the above requirement for the execution of process instances of the two processes as shown in FIG. 3.

After the above policy 320 is defined, the management of the execution of the process instances of the two processes is based on the above policy 320, which will be described in details below.

FIG. 4 shows two tables stored in the instance guarding database 112, i.e., an instance guarding table 401 and a policy execution table 402, according to one embodiment of the present invention. The instances guard engine 107 interact with these two tables to maintain the runtime data for managing the execution of process instances based on the policies, as indicated by arrow 204 in FIG. 2.

The instance guarding table 401 includes four columns. The first column is "Instance id", which is used to identify a process instance. The second column is "Policy id", which is used to identify a policy. The third column is "Original status" which indicates the status of a process instance before a status change event related to the process instance is received by the instances guard engine 107. The fourth column is "Action taken?", which indicates whether an action is taken after the status change event related to the process instance is received by the instances guard engine 107. Each row of the instance guarding table 401 indicates the execution status of one process instance. For example, the second row of the instance guarding table indicates that a process instance has an "Instance id" 1002. The execution of this process instance is managed by a policy with a "Policy id" p2. Before a status change event related to process instance 1002 is received by the instances guard engine 107, the status of process instance 1002 is "Active". After a status change event related to process instance 1002 is received by the instances guard engine 107, the action in policy p2 is executed on process instance 1002. Thus, "Action taken?" is "Y" (yes).

The policy execution table 402 includes two columns. The first column is "Policy id", which is used to identify a policy. The second column is "Execution status", which indicates the status of the policy. Each row of the policy execution table 402 indicates the execution status of one policy. For example, the second row of the policy execution table indicates that a policy has a "Policy id" p2 and this policy has a status of "Active".

In the following, a policy with a "Policy id" p2 in the instance guarding table 401 and the policy execution table 402 of FIG. 4 is referred to as "policy p2". Similarly, a process instance with an "Instance id" 1002 is referred to as "process instance 1002".

The management of the execution of process instances involves accessing or modifying the runtime data in the instance guarding table 401 and the policy execution table 402. Still taking the execution of process instances of the two processes in FIG. 3 as an example, and assuming that the policy 320 defined above is policy p2 in the instance guarding table 401 and the policy execution table 402 of FIG. 4, two exemplary embodiments of the present invention are described in details below.

In one embodiment, the instances guard system 100 can guard or manage the execution of existing process instances based on the policies. The users have defined all the policies through the policy definition tool 106 and saved the policies in the policy definition database 111. A status change event related to a project plan approval process instance is received from a BPM engine 105. The status change event is that the project plan for department A is not approved by the general manager at step 302, i.e., the project plan approval process instance is ended directly after step 302. Thus, the status change event indicates that the project plan approval process instance has an attribute of "department Id: A" and an attribute of "process.data.managerApproval=false". The instances guard engine 107 can read a plurality of policy definitions from the policy definition database 111 and match the project plan approval process instance to one of the policies stored in the policy definition database 111. If the process instance has attributes that are the same as the required attributes in the condition of a policy, the condition is matched. In this example, the project plan approval process instance has attributes that are the same as the required attributes in the condition of policy p2.

When the condition of policy p2 is matched, the instances guard engine 107 can mark the policy's execution status as "Active" in the policy execution table 402 stored in the instance guarding database 112. The mark indicates that policy p2 is in active status because its condition is met. Thus, the action defined in policy p2 should be executed on the set of process instances specified in the policy target descriptor of policy p2. In this example, the set of process instances specified in the policy target descriptor of policy p2 includes all employee hiring process instances that request a new position for department A and that the manager is actively implementing the task of review for approval at step 312.

The instances guard engine 107 checks the instance guarding table 401 to identify all the existing, i.e., currently running, process instances that match the set of process instances. In this example, the instances guard engine 107 checks the instance guarding table 401 to identify all the existing employee hiring process instances that is managed by policy p2. The instances guard engine 107 requests the process engine 105 to execute the suspend action defined in policy p2 on all the identified process instances. According to the instance guarding table 401, process instance 1002 with an original status "Active" is managed by policy p2. Thus, the "suspend" action of policy p2 is executed on process instance 1002. And "Action taken?" for process instance 1002 is "Y" (yes).

The above embodiment is an example that the instances guard engine 107 can interact with the instances guarding database 112 to maintain the instances guard runtime data for managing the execution of process instances based on the policies, as indicated by arrow 204 in FIG. 2.

The instances guard system 100 can also guard or manage the execution of upcoming process instances according to another embodiment of the present invention. For example, an employee hiring process instance 1007 is not existed or generated when policy p2 is indicated as an active policy. After the instances guard engine 107 marks the policy p2's execution status as "Active" in the policy execution table 402, employee hiring process instance 1007 is generated. After employee hiring process instance 1007 is generated, a row for employ hiring process instance 1007 is created in the instance guarding table 401, as shown in FIG. 4.

A status change event related to employ hiring process instance 1007 is received from the BPM engine 105. The status change event is that employee hiring process instance 1007 that requests a new position for department A is actively implementing the task of manager's review for approval at step 312. In other words, the status change event is that employee hiring process instance 1007 is implemented from step 311 to step 312. Thus, the status change event indicates that employ hiring process instance 1007 has an attribute of "department Id: A" and an attribute of "process.task.managerApproval=active". The instances guard engine 107 can read policy definitions from the policy definition database 111 and match employ hiring process instance 1007 to a policy stored in the policy definition database 111. If the process instance has attributes that are the same as the attributes of the set of process instances specified by the policy target descriptor of a policy, the policy target descriptor is matched. In this example, employ hiring process instance 1007 has attributes that are the same as the attributes of the set of process instances specified by the policy target descriptor of the policy p2. Thus, employ hiring process instance 1007 is managed by policy p2, as indicated in the instance guarding table 401.

When the policy target descriptor of policy p2 is matched, the instances guard engine 107 can check the policy execution table 402 stored in the instance guarding database 112 to determine the execution status of policy p2. In one embodiment, the instances guard engine 107 can check the policy execution table 402 to determine the execution status of policy p2 by querying the instances guarding database 112. In this example, the execution status corresponding to policy p2 is "Active" as shown in FIG. 4. As explained above, policy p2 is indicated as an active policy before employee hiring process instance 1007 is generated. Because policy p2 is active, the instances guard engine 107 requests the BPM engine 105 to execute the suspend action defined in policy p2 on employee hiring process instance 1007 with an original status "Active". Also, the instances guard engine 107 marks the "Action taken" corresponding to employee hiring process instance 1007 in the instances guarding table 401 as "Y" (Yes). As mentioned above, in this embodiment, the process instance matching the policy target descriptor of a policy is not existed or generated when the policy is indicated as an active policy.

On the other hand, if the execution status corresponding to a policy is "Inactive", the instances guard engine 107 does not request the BPM engine 105 to execute the action defined in the inactive policy. In this situation, the instances guard engine 107 marks the "Action taken" corresponding to the process instance in the instance guarding table as "N" (No). And no action is taken on the process instance. For example, policy p1 in the policy execution table 402 is "Inactive". No action is taken on process instances 1001 managed by policy p1 and "Action taken" corresponding to process instances 1001 is "N" (No).

This embodiment is another example that the instances guard engine 107 can interact with the instances guarding database 112 to maintain the instances guard runtime data for managing the execution of process instances based on the policies, as indicated by arrow 204 in FIG. 2.

Figure 5:
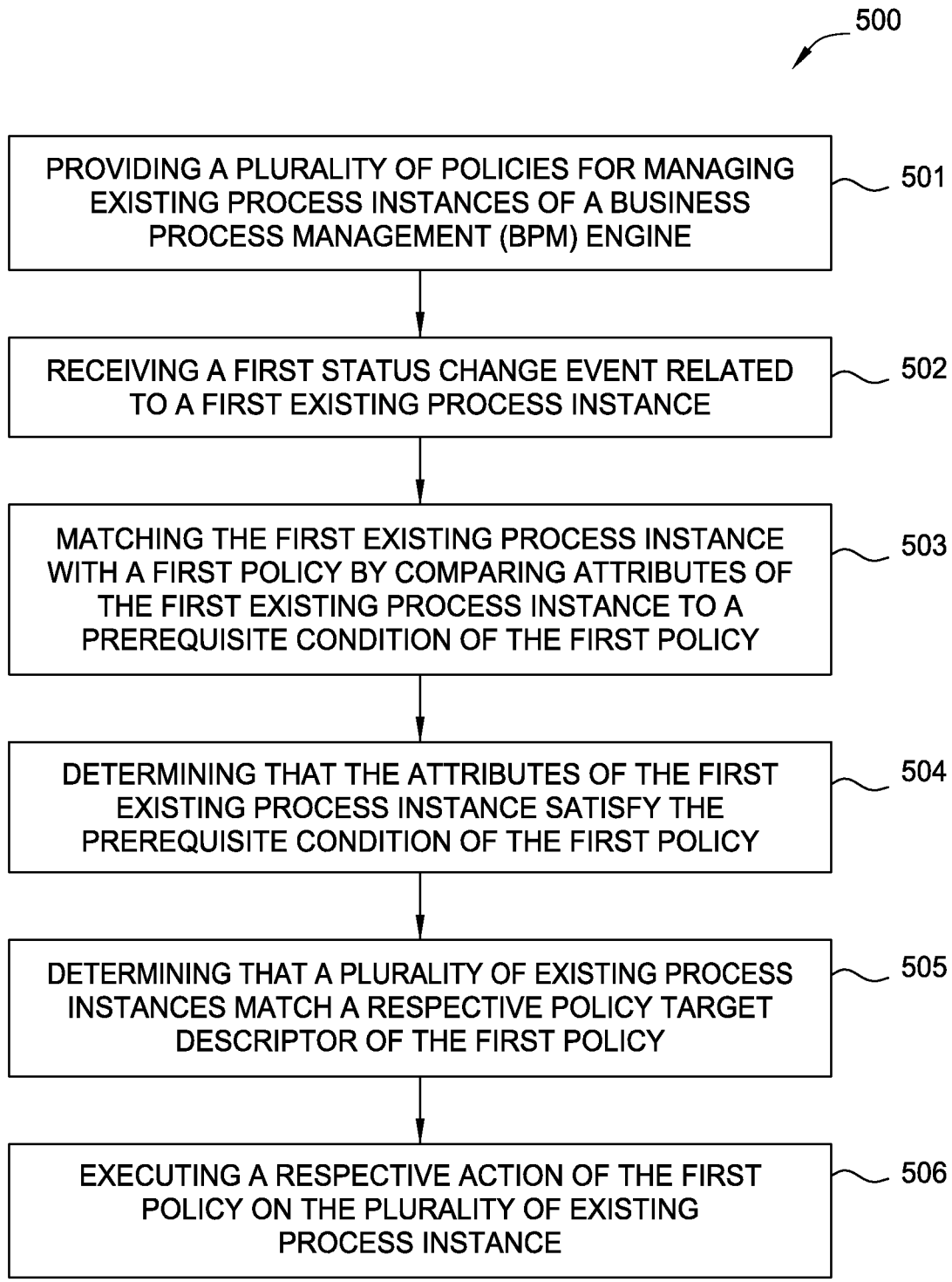
FIG. 5 is a flow chart illustrating a method for managing the execution of process instances, according to one embodiment described herein.

FIG. 5 is a flow chart illustrating a method 500 for managing the execution of process instances, according to one embodiment of the present invention. At block 501, the process instances guard system 100 provides a plurality of policies for managing existing process instances of a BPM engine. For example, the users can define a plurality of policies by using the policy definition tool 106. At block 502, the process instances guard system 100 receives a first status change event related to a first existing process instance. For example, the instances guard engine 107 can receive a status change event related to a project plan approval process instance from the BPM engine 105. At block 503, the process instances guard system 100 matches the first existing process instance with a first policy by comparing attributes of the first existing process instance to the prerequisite condition of the first policy. For example, the instances guard engine 107 can read policy definitions from the policy definition database 111 and match the project plan approval process instance to a policy stored in the policy definition database 111. At block 504, the process instances guard system 100 determines that the attributes of the first existing process instance satisfy the prerequisite condition of the first policy. For example, the project plan approval process instance has attributes that are the same as the required attributes in the condition of policy p2. At block 505, the process instances guard system 100 determines that a plurality of existing process instances match the respective policy target descriptor of the first policy. For example, the instances guard engine 107 can check the instance guarding table 402 to identify all the existing process instances that match the policy target descriptor of policy p2. At block 506, the process instances guard system 100 executes the respective action of the first policy on the plurality of existing process instances. For example, the instances guard engine 107 requests the process engine 105 to execute the suspend action defined in policy p2 on all the identified process instances.

The present invention manages the execution of existing or upcoming process instances to satisfy the real-time or ad-hoc requirements automatically. With the present invention, user requirements can be modeled clearly and saved permanently in database as policies. All process instances can be managed or guarded automatically. Also, there is no invasion to the BPM engine, thus the BPM engine is not changed. Moreover, it is a runtime guard mechanism, thus the original business process definitions are not changed.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
providing, by a processor, a plurality of policies for managing existing process instances of a business process management (BPM) engine, wherein each of the plurality of policies comprises:
a policy target descriptor specifying a set of process instances;
an action to be executed; and
a prerequisite condition to perform the action;
receiving, by the processor, a first status change event related to a first existing process instance, wherein the first existing process instance is defined by a first process definition, wherein the first process definition specifies a first workflow to implement a first plurality of related tasks of a first process;
matching, by the processor, the first existing process instance with a first policy of the plurality of policies, by comparing attributes of the first existing process instance to the prerequisite condition of the first policy; and
in response to determining that the attributes of the first existing process instance satisfy the prerequisite condition of the first policy:
determining, by the processor, that a plurality of existing process instances match a respective policy target descriptor of the first policy, wherein the plurality of existing process instances are defined by a second process definition that specifies a second workflow to implement a second plurality of related tasks of a second process;
executing, by the processor, a respective action of the first policy on the plurality of existing process instances; and
updating, by the processor, in an instance guarding table, a respective field of a respective row associated with each respective process instance of the plurality of existing process instances to indicate that the respective action has been performed on the respective process instance, wherein the respective row associated with each respective process instance of the plurality of existing process instances in the instance guarding table comprises:
an identifier of the first policy; and
an original status of the respective process instance that indicates whether the respective process instance was active prior to the first status change event.

2. The computer-implemented method of claim 1, further comprising:
receiving a second status change event related to a second existing process instance from the BPM engine, wherein the second existing process instance is defined by the second process definition,
matching the second existing process instance with the first policy by comparing attributes of the second existing process instance to the policy target descriptor of the first policy; and
in response to determining that the second existing process instance matches the policy target descriptor of the first policy:
determining that the first policy is active; and
executing the respective action of the first policy on the second existing process instance.

3. The computer-implemented method of claim 2, further comprising:
in response to determining that the attributes of the first existing process instance satisfy the prerequisite condition of the first policy:
indicating the first policy as active by marking an execution status of the first policy as active, wherein the execution status of the first policy is stored in a policy execution table of a database.

4. The computer-implemented method of claim 3, wherein the second existing process instance is generated when the first policy is marked as active.

5. The computer-implemented method of claim 2, wherein the first and second status change events include one of:
creating a corresponding process instance;
ending the corresponding process instance; and
implementing the corresponding process instance from a first task to a second task of a corresponding process definition.

6. The computer-implemented method of claim 1, wherein the policy target descriptor of at least one of the plurality of policies specifies multiple sets of process instances with different process definitions.

7. The computer-implemented method of claim 1, wherein providing a plurality of policies for managing existing process instances of a business process management (BPM) engine comprises defining the plurality of policies through user input.

8. A system, comprising:
a processor;
a memory containing a program that, when executed on the processor, performs an operation, the operation comprising:
providing, by a processor, a plurality of policies for managing existing process instances of a business process management (BPM) engine, wherein each of the plurality of policies comprises:
a policy target descriptor specifying a set of process instances;
an action to be executed; and
a prerequisite condition to perform the action;
receiving, by the processor, a first status change event related to a first existing process instance, wherein the first existing process instance is defined by a first process definition, wherein the first process definition specifies a first workflow to implement a first plurality of related tasks of a first process;
matching, by the processor, the first existing process instance with a first policy of the plurality of policies, by comparing attributes of the first existing process instance to the prerequisite condition of the first policy; and
in response to determining that the attributes of the first existing process instance satisfy the prerequisite condition of the first policy:
determining, by the processor, that a plurality of existing process instances match a respective policy target descriptor of the first policy, wherein the plurality of existing process instances are defined by a second process definition that specifies a second workflow to implement a second plurality of related tasks of a second process;
executing, by the processor, a respective action of the first policy on the plurality of existing process instances; and
updating, by the processor, in an instance guarding table, a respective field of a respective row associated with each respective process instance of the plurality of existing process instances to indicate that the respective action has been performed on the respective process instance, wherein the respective row associated with each respective process instance of the plurality of existing process instances in the instance guarding table comprises:
an identifier of the first policy; and
an original status of the respective process instance that indicates whether the respective process instance was active prior to the first status change event.

9. The system of claim 8, wherein the operation further comprises:
receiving a second status change event related to a second existing process instance from the BPM engine, wherein the second existing process instance is defined by the second process definition,
matching the second existing process instance with the first policy by comparing attributes of the second existing process instance to the policy target descriptor of the first policy; and
in response to determining that the second existing process instance matches the policy target descriptor of the first policy:
determining that the first policy is active; and
executing the respective action of the first policy on the second existing process instance.

10. The system of claim 9, wherein the operation further comprises:
in response to determining that the attributes of the first existing process instance satisfy the prerequisite condition of the first policy:
indicating the first policy as active by marking an execution status of the first policy as active, wherein the execution status of the first policy is stored in a policy execution table of a database.

11. The system of claim 10, wherein the second existing process instance is generated when the first policy is marked as active.

12. The system of claim 9, wherein the first and second status change events include one of:
- creating a corresponding process instance;
- ending the corresponding process instance; and
- implementing the corresponding process instance from a first task to a second task of a corresponding process definition.

13. The system of claim 8, wherein the policy target descriptor of at least one of the plurality of policies specifies multiple sets of process instances with different process definitions.

14. The system of claim 8, wherein providing a plurality of policies for managing existing process instances of a business process management (BPM) engine comprises defining the plurality of policies through user input.

15. A computer program product, comprising:
- a computer-readable storage medium having computer readable program code embodied therewith, the computer readable program code comprising instructions that, when executed by a processor, cause the processor perform a method, the method comprising:
- providing, by a processor, a plurality of policies for managing existing process instances of a business process management (BPM) engine, wherein each of the plurality of policies comprises:
  - a policy target descriptor specifying a set of process instances;
  - an action to be executed; and
  - a prerequisite condition to perform the action;
- receiving, by the processor, a first status change event related to a first existing process instance, wherein the first existing process instance is defined by a first process definition, wherein the first process definition specifies a first workflow to implement a first plurality of related tasks of a first process;
- matching, by the processor, the first existing process instance with a first policy of the plurality of policies, by comparing attributes of the first existing process instance to the prerequisite condition of the first policy; and
- in response to determining that the attributes of the first existing process instance satisfy the prerequisite condition of the first policy:
  - determining, by the processor, that a plurality of existing process instances match a respective policy target descriptor of the first policy, wherein the plurality of existing process instances are defined by a second process definition that specifies a second workflow to implement a second plurality of related tasks of a second process;
  - executing, by the processor, a respective action of the first policy on the plurality of existing process instances; and
  - updating, by the processor, in an instance guarding table, a respective field of a respective row associated with each respective process instance of the plurality of existing process instances to indicate that the respective action has been performed on the respective process instance, wherein the respective row associated with each respective process instance of the plurality of existing process instances in the instance guarding table comprises:
    - an identifier of the first policy; and
    - an original status of the respective process instance that indicates whether the respective process instance was active prior to the first status change event.

16. The computer program product of claim 15, wherein the method further comprises:
- receiving a second status change event related to a second existing process instance from the BPM engine, wherein the second existing process instance is defined by the second process definition,
- matching the second existing process instance with the first policy by comparing attributes of the second existing process instance to the policy target descriptor of the first policy; and
- in response to determining that the second existing process instance matches the policy target descriptor of the first policy:
  - determining that the first policy is active; and
  - executing the respective action of the first policy on the second existing process instance.

17. The computer program product of claim 16, wherein the method further comprises:
- in response to determining that the attributes of the first existing process instance satisfy the prerequisite condition of the first policy:
  - indicating the first policy as active by marking an execution status of the first policy as active, wherein the execution status of the first policy is stored in a policy execution table of a database; and wherein the second existing process instance is generated when the first policy is marked as active.

18. The computer program product of claim 16, wherein the first and second status change events include one of:
- creating a corresponding process instance;
- ending the corresponding process instance; and
- implementing the corresponding process instance from a first task to a second task of a corresponding process definition.

19. The computer program product of claim 15, wherein the policy target descriptor of at least one of the plurality of policies specifies multiple sets of process instances with different process definitions.

20. The computer program product of claim 15, wherein the method further comprises providing a plurality of policies for managing existing process instances of a business process management (BPM) engine by defining the plurality of policies through user input.

\* \* \* \* \*